T. L. BURTON.
BRAKE RIGGING APPLICATION TO TRUCKS.
APPLICATION FILED JAN. 25, 1913.
1,148,285.
Patented July 27, 1915.
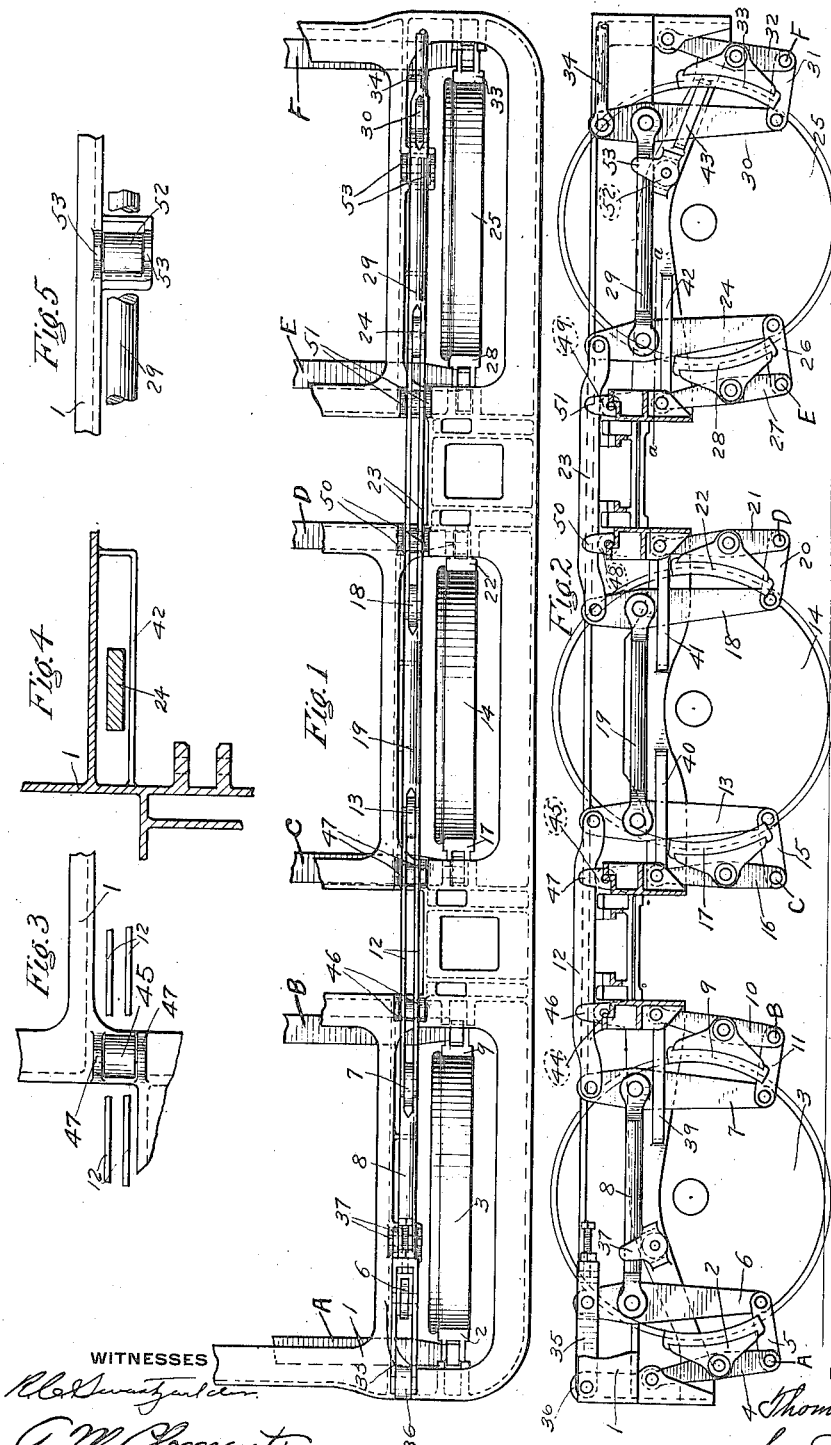
INVENTOR
Thomas L. Burton
by Wm. M. Cady
Att'y.

UNITED STATES PATENT OFFICE.

THOMAS LANE BURTON, OF PITTSBURGH, PENNSYLVANIA, ASSIGNOR, BY MESNE ASSIGNMENTS, TO THE AMERICAN BRAKE COMPANY, OF ST. LOUIS, MISSOURI, A CORPORATION OF MISSOURI.

BRAKE-RIGGING APPLICATION TO TRUCKS.

1,148,285. Specification of Letters Patent. Patented July 27, 1915.

Application filed January 25, 1913. Serial No. 744,156.

*To all whom it may concern:*

Be it known that I, THOMAS L. BURTON, a citizen of the United States, residing at Pittsburgh, in the county of Allegheny and State of Pennsylvania, have invented new and useful Improvements in Brake-Rigging Application to Trucks, of which the following is a specification.

This invention relates to brake rigging for railway cars, and more particularly to the application of the brake rigging to the car truck frame.

The principal object of my invention is to provide a car truck frame having the brake rigging supports and guides integral with the frame.

In the accompanying drawing; Figure 1 is a plan view of one side of a truck frame showing the brake rigging and having my improvement applied thereto; Fig. 2 a side elevation thereof with the truck frame broken away to show the application of the brake rigging to the truck; Fig. 3 a top plan view of a portion of the truck frame, showing the roller lugs for supporting one of the pull rods of the brake rigging; Fig. 4 a horizontal section of a portion of the truck frame on the line *a—a* of Fig. 2, showing a vertical lever guide for one of the brake levers; and Fig. 5 a top plan view of a portion of the truck frame, showing the roller guide lugs for one of the pull rods of the brake rigging.

My improvement is to be considered more particularly in connection with a truck frame of the type now commonly employed in which the frame is made of cast steel, and accordingly, in the drawing a cast steel car truck frame 1 is shown and while the invention is not limited in its application, I have shown the same in connection with a six wheel truck frame having a so-called clasp brake rigging applied thereto.

The arrangement of the brake rigging for the car wheels at one side of the truck will now be described, it being understood that the same arrangement is applied to the car wheels at the opposite side of the truck.

Commencing at the left of Fig. 1, the brake shoe 2 applied to one side of the car wheel 3 is carried by a hanger lever 4 pivoted to the truck frame 1 and the same is pivotally connected to brake beam A and said brake beam is connected by links 5 with a vertical brake lever 6. The lever 6 is pivotally connected to a vertical brake lever 7 at the opposite side of the wheel 3 by a pull rod 8 and the opposite brake shoe 9 is carried by hanger lever 10 connected to brake beam B, links 11 connecting said brake beam with lever 7. An upper pair of pull rods 12 pivotally connect lever 7 with the lever 13 at one side of the middle wheel 14 and lever 13 is connected by links 15 with brake beam C which carries hanger lever 16 of brake shoe 17. Lever 13 is pivotally connected to the opposite vertical lever 18 by pull rod 19 and links 20 connect lever 18 with brake beam D of hanger lever 21 for brake shoe 22. Upper pull rods 23 connect brake lever 18 with brake lever 24 at one side of wheel 25 and links 26 connect lever 24 with brake beam E for hanger lever 27 carrying brake shoe 28. Pull rod 29 connects vertical lever 24 with vertical lever 30 and links 31 connect lever 30 with brake beam F in turn connected to hanger lever 32 of the brake shoe 33. The upper end of brake lever 30 is pivotally connected to rod 34 through which power is transmitted to the brake rigging and the upper end of the vertical lever 6 at the opposite end of the truck is pivotally connected to links 35 which may be provided with a suitable adjusting device for taking up the slack in the brake rigging.

According to my invention, the links 35 are pivoted to a lug 36 cast integral with the truck frame 1. For guiding the pull rod 8, lugs 37 and cast integral with the truck frame at a point intermediate the vertical levers 6 and 7 and within said lugs a roller 38 is pivotally mounted, upon which the pull rod 8 is adapted to rest. A guide bar 39 is cast integral with the truck frame below the pull rod 8 and in position to serve as a guide for the vertical lever 7, and similar guide bars 40, 41, 42, and 43 are provided to guide the respective vertical levers 13, 18, 24, and 30, a plan view of the guide bar 42 being shown in Fig. 4 of the drawing.

The upper pull rods 12 are supported on rollers 44 and 45, pivotally mounted intermediate the respective pairs of guide lugs 46 and 47 and the rods 23 are supported on rollers 48 and 49, pivotally mounted intermediate the respective pairs of guide lugs 50 and 51.

The pull rod 29 is supported by a roller 52 pivotally mounted intermediate the guide lugs 53, a plan view of this roller and the guide lugs being shown in Fig. 5 of the drawing.

It will now be seen that I have provided a simplified car truck construction in which the guides and supports for the brake rigging are cast integral with the frame, thus doing away with the labor necessary to secure separate guides and supports to the frame as well as providing a more secure construction.

Having now described my invention, what I claim as new and desire to secure by Letters Patent, is:—

1. In a brake rigging for railway trucks, the combination with truck levers for the brake shoes of adjacent wheels, and pull rods connecting said levers, of a truck frame having lugs formed integral therewith for guiding and supporting said pull rods, and bars also integral with the frame for guiding said truck levers.

2. In a brake rigging for railway trucks, the combination of brake beams applied to both sides of each pair of wheels, vertical truck levers supported on the frame and having link connections at their lower ends for actuating said brake beams, hanger levers supporting said brake beams, and brake shoes pivotally supported at an intermediate point upon said hanger levers.

In testimony whereof I have hereunto set my hand.

THOMAS LANE BURTON.

Witnesses:
A. M. CLEMENTS,
W. W. MARTIN.